Patented Apr. 22, 1941

2,239,000

UNITED STATES PATENT OFFICE 2,239,000

TREATMENT OF GASES CONTAINING SULPHUR

Walter Henry Groombridge and Ronald Page, Spondon, near Derby, England, assignors to Celanese Corporation of America, a corporation of Delaware No Drawing. Application November 16, 1938, Serial No. 240,790. In Great Britain December 17, 1937

6 Claims. (Cl. 252—373)

This invention relates to the treatment of gases containing sulphur, and especially to the treatment of sulphur-containing gas mixtures comprising hydrogen and carbon monoxide, with a view to rendering them suitable for conversion into hydrocarbons or other compounds.

It is known that mixtures of carbon monoxide and hydrogen, if caused to react in the presence of suitable catalysts, can be converted either into methane or into higher hydrocarbons, or, especially when high pressures are employed, into oxygenated organic compounds, for instance lower aliphatic alcohols. Gas mixtures comprising carbon monoxide and hydrogen which are relatively easily obtained, for example water gas, are however not as a rule altogether suitable for immediate conversion. For example they usually contain sulphur in amount sufficient to poison the catalyst and/or the proportion of carbon monoxide to hydrogen in the mixture may be too high, as it is for example in water gas.

The present invention provides a means whereby in a single stage a large proportion of the sulphur contained in such mixtures, or in other gases, can be converted into a form in which it is readily removable by treatment with alkali, and at the same time the amount of carbon monoxide in carbon monoxide-hydrogen mixtures may be decreased and that of hydrogen increased.

According to the invention the gases are passed at an elevated temperature over one of the following catalyst mixtures: ferric oxide and chromic oxide; ferric oxide and magnesium oxide; chromic oxide and nickel; chromic oxide and zinc oxide; ferric oxide and zinc oxide. When the gases contain carbon monoxide, part of which is to be converted into hydrogen, they are passed over the catalyst in admixture with water vapour.

Although any of the catalyst mixtures indicated may be employed, it is usually preferable to use a mixture of ferric oxide and zinc oxide, on account of the great reduction in sulphur content which this catalyst mixture makes possible. Catalysts comprising between 60 and 80% of ferric oxide and between 40 and 20% of zinc oxide are especially good.

Certain suitable catalyst mixtures occur as minerals, for example chrome iron ore and ankerite (which appears to be a complex carbonate of calcium, iron and magnesium). Such minerals are preferably broken down to about 8–12 mesh before being used. If desired, instead of using minerals, synthetic mixtures of similar compositions, prepared for example by igniting mixtures of the carbonates of the metals, may be employed.

The catalysts are, however, preferably prepared by precipitation methods. For example to produce a chromic oxide-zinc oxide catalyst a solution of zinc and chromium nitrates, preferably containing a greater molecular proportion of zinc than of chromium, may be precipitated with sodium carbonate. Advantageously the molecular ratio of zinc to chromium may be between about 2:1 and 8:1. A usefule way of making the nickel-containing catalyst is to precipitate with dilute aqueous sodium carbonate a solution of chromic chloride and nickel nitrate, for example with a molecular ratio of chromium to nickel between 4:1 and 6:1; preferably the solutions are mixed at a temperature of about 100° C. In both cases the precipitates may be thoroughly washed, and then dried at room temperature or at higher temperatures, e. g. temperatures up to about 100°–120° C. The precipitates are then preferably shaped or "formed," for example by being compressed into tablets or extruded as rods, and the formed mass may advantageously be broken down, for example to 8–12 mesh. Before use it is preferable to heat the catalysts in a reducing gas, for example a mixture of carbon monoxide and hydrogen, to a relatively high temperature, for instance a temperature of 300°–500° C. This heating may last for several hours, and in the case of the nickel catalyst it should be carried on at least until substantially all the nickel oxide has been reduced to nickel.

The ferric oxide-zinc oxide catalysts are also preferably made by precipitation; for instance a mixture of the oxides may be precipitated from a solution containing ferric chloride and zinc chloride by means of an alkali, for example sodium carbonate or ammonium hydroxide. The precipitate so obtained may be washed by decantation or filtration or in any other way until it is free from chloride. Preferably it is then compressed into tablets or otherwise shaped and dried in an air oven, for example at temperatures above about 80° C., and especially temperatures of about 100° C. Like the other catalysts, it may advantageously be broken down and graded to 8-12 mesh before use.

When, as is usual, part of the sulphur content of a gas is in a form such that it is removable by alkali, it is preferable first to wash the gas with an alkaline solution in order to remove as much of the sulphur as possible before subjecting it to the process of the present invention. For example the gas may be caused to flow up a tower in counter-current to a stream of caustic soda solution. It may then be passed, if desired, in admixture with water, over one of the catalysts specified above, preferably at a temperature between about 400° and 600° C.; especially when, as is preferred, a ferric oxide-zinc oxide catalyst is used, temperatures between 500° and 550° C. may be used with advantage. After leaving the catalyst the gases may again be washed with an alkali, preferably caustic soda, so as to remove the alkali-soluble sulphur compounds formed in the reaction.

When treating water gas to produce a gas more suitable for conversion into methane or higher hydrocarbons, it is preferable to add water vapour in at least the same amount by volume as the carbon monoxide. Generally speaking good results are obtained when the volume of water vapour is equal to or up to twice or three times that of the carbon monoxide. Using these proportions of water vapour at a temperature between 500° and 550° C. over a ferric oxide-zinc oxide catalyst, there may be obtained a gas, containing very approximately twice as much hydrogen as carbon monoxide, which is suitable for the hydrocarbon synthesis. Even higher proportions of water may be used, especially in conjunction with yet higher temperatures.

It appears that the reaction between the water vapour and carbon monoxide proceeds considerably faster than the conversion of sulphur compounds into alkali-soluble and therefore easily removable sulphur compounds, and the latter reaction therefore determines the rate at which the gas may be passed over the catalyst. This rate will also depend on the temperature and the precise properties of the catalyst employed, and the particular rate necessary in any particular set of conditions may be readily determined by simple test.

The following examples illustrate the invention without in any way limiting it.

*Example 1*

Water gas containing approximately 300 mg. sulphur in each cubic metre of gas is passed up a scrubbing tower in counter-current to a solution of caustic soda, whereby the greater part of the sulphur is removed. The gas is mixed with about 75% by volume of water vapour, and is passed at a space velocity of 50 over a ferric oxide-zinc oxide catalyst (Fe:Zn=7:4) heated to 500° C. After a final alkali wash the resulting gas has a low sulphur content and a carbon monoxide-hydrogen ratio of the order of 1:2.

*Example 2*

Water gas, after as much sulphur as possible has been removed by scrubbing with caustic soda, is mixed with about its own volume of water vapour and passed, at a space velocity of 30-50, over the same ferric oxide-zinc oxide catalyst at a temperature of 550° C. The greater part of the sulphur is converted into a form easily removed with alkali, and the carbon monoxide-hydrogen ratio approximates to 1:2.

*Example 3*

Water gas washed with caustic soda solution as described in Example 1 and admixed with half its volume of water vapour is passed with a space velocity of 60 and at a temperature of 400° C. in contact with a catalyst comprising zinc oxide and chromium oxide (Zn:Cr=4:1). A considerable proportion of the sulphur remaining after the initial alkali wash is converted into an alkali-soluble form, and the carbon monoxide-hydrogen ratio of the resulting gas is about 1:2.

*Example 4*

Water gas, after an initial alkali wash is mixed with half its volume of water vapour, and led at a space velocity of 100 over a formed chromic oxide-nickel catalyst (Cr:Ni=2:1) at a temperature of 450° C. The carbon monoxide ratio of the resulting gas is about 2:3.

Having described our invention, what we desire to secure by Letters Patent is:

1. Process for the treatment of sulphur-containing gas mixtures comprising carbon monoxide and hydrogen so as to facilitate subsequent removal of sulphur by alkali and at the same time to decrease the proportion of carbon monoxide so as to render the mixture suitable for synthesis into hydrocarbons, which comprises passing the gas at a temperature of 400-600° C. and in admixture with water vapor in contact with ferric oxide in admixture with zinc oxide.

2. Process for the treatment of sulphur-containing gas mixtures comprising carbon monoxide and hydrogen so as to facilitate subsequent removal of sulphur by alkali and at the same time to decrease the proportion of carbon monoxide so as to render the mixture suitable for synthesis into hydrocarbons, which comprises passing the gas at a temperature of 400-600° C. and in admixture with water vapor in contact with a mixture of 60-80% of ferric oxide with 40-20% of zinc oxide.

3. Process for the treatment of sulphur-containing gas mixtures comprising carbon monoxide and hydrogen so as to facilitate subsequent removal of sulphur by alkali and at the same time to decrease the proportion of carbon monoxide so as to render the mixture suitable for synthesis into hydrocarbons, which comprises passing the gas at a temperature of 500-550° C. and in admixture with water vapor in contact with a mixture of 60-80% of ferric oxide with 40-20% of zinc oxide.

4. Process for the treatment of sulphur-containing water gas so as to facilitate subsequent removal of sulphur by alkali and at the same time to decrease the proportion of carbon monoxide so as to render the mixture suitable for synthesis into hydrocarbons, which comprises passing the gas at a temperature of 400-600° C. and in admixture with a proportion of water vapor at least equal by volume to that of the carbon monoxide in contact with ferric oxide in admixture with zinc oxide.

5. Process for the treatment of sulphur-containing water gas so as to facilitate subsequent removal of sulphur by alkali and at the same time to decrease the proportion of carbon monoxide so as to render the mixture suitable for synthesis into hydrocarbons, which comprises passing the gas at a temperature of 500-550° C. and in admixture with a proportion of water vapor at least equal by volume to that of the carbon monoxide in contact with a mixture of 60–80% of ferric oxide and 40–20% of zinc oxide.

6. Process for the treatment of sulphur-containing water gas so as to facilitate subsequent removal of sulphur by alkali and at the same time to decrease the proportion of carbon monoxide so as to render the mixture suitable for synthesis into hydrocarbons, which comprises washing the gas with an aqueous solution of a caustic alkali, passing the gas at a temperature of 500–550° C. and in admixture with a proportion of water vapor at least equal by volume to that of the carbon monoxide in contact with a mixture of 60–80% of ferric oxide and 40–20% of zinc oxide, and again washing the gas with an aqueous solution of caustic alkali.

WALTER HENRY GROOMBRIDGE.
RONALD PAGE.